T. E. KERSH.
PLOW.

No. 187,763. Patented Feb. 27, 1877.

WITNESSES
Villette Anderson.
Sturg B. Ladd.

Thomas Ezra Kersh INVENTOR
By Paine & Grafton
ATTORNEYS

UNITED STATES PATENT OFFICE

THOMAS E. KERSH, OF PALESTINE, TEXAS.

IMPROVEMENT IN PLOWS.

Specification forming part of Letters Patent No. 187,763, dated February 27, 1877; application filed December 29, 1876.

*To all whom it may concern:*

Be it known that I, THOMAS E. KERSH, of Palestine, in the county of Anderson and State of Texas, have invented certain new and useful Improvements in Plows; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention is an improvement in the auxiliary blades attached to plows for the purpose of cutting and exterminating the grass and weeds growing with the crop, as well as leveling and distributing the earth turned up by the plow; and consists in the improved method of constructing and attaching the blade to a plow, so that it can be shifted and adjusted in different positions.

Figure 1:
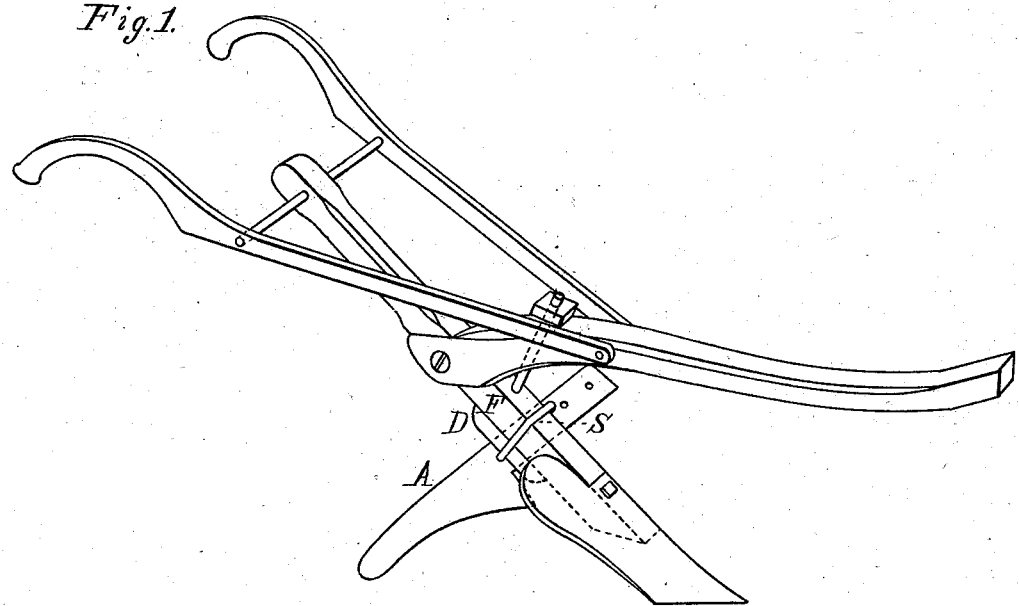
Figure 2:
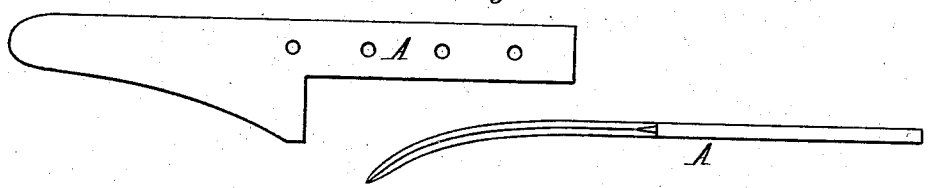

Figure 1 is a perspective view of a plow with this improved attachment, and Fig. 2 shows the attachment A in plan and side elevation.

The blade or share A is made of iron or steel, and bears some resemblance to a large carving-knife, the point being turned back, so as to convey fresh dirt to the drills from the top of the sod turned under by the plow, thereby covering and destroying all grass, weeds, &c., which may be growing with the crop cultivated.

The blade A is made with a number of bolt-holes in what may be called its handle. The handle, so called, is made very long, so that the blade can be set close to the foot-beam F, or some distance from it, as desired. The blade A is fastened to the foot-beam by means of the stirrup-iron S, which passes around the foot-beam F, and the ends pass through the holes in the handle of the blade or share A. Nuts on the ends of the stirrup-iron S hold the blade firmly to the beam.

The blade A may be raised or lowered on the foot-beam, and clamped to the beam at any point.

If it is desired to set the blade back, a block, D, is placed between the blade and the beam. The block D may be of any width, so that it will bring the blade into the desired position.

The blade A can be moved in six different ways: up or down, by sliding it on the foot-beam; backward or forward, by means of the block D; to the right or to the left, by means of the bolt-holes in the handle of the blade.

To attach A to turning-plows, such as Avery's, Kelley's, and all others of like pattern, I use two stirrup-irons, passing them around the handles below the beam, and firmly fastening A to its place, when the same result will be obtained as when used on other plows.

To attach A to the Brinley plow and all others of like construction, only one stirrup-iron is required.

To make share A cut shallow into the earth turned up in front of it by the plow, move it upward on the foot-beam. To make it cut deep, move it downward. To make it perform the work of a sweep, move it backward, by loosening the nuts on the stirrup-iron and inserting block D between foot-beam and share A. To make it give the earth as it leaves the plow another or a double turn, remove block D, lower the share A, and make fast the nuts. To make the loose earth turned up by the plow fall farther from the furrow, move share A to the right. To make it remove the earth from the margin in cutting a ditch with any plow, move the share A downward until it will catch all the loose earth turned up by the plow. When thus placed it will convey the earth away from the furrow or ditch, leaving a clean firm margin, varying in width according to the size of the plow used and the length of the share A.

What I claim as my invention, and desire to secure by Letters Patent, is—

The combination, substantially as herein set forth, of the blade A, made with a series of bolt-holes in the shank, for the purpose of allowing a side adjustment; the stirrup-iron S, with the nuts on its ends, for fastening the blade to the foot-beam of a plow; and the foot-beam F, constructed so that the blade can be moved and secured to it in the adjustable manner described.

In testimony that I claim the foregoing as my own I affix my signature in presence of two witnesses.

THOMAS EZRA KERSH.

Witnesses:
THOMAS JEFFERSON JOHNSON,
ALBERT GALETON BUTLER.